US010365112B2

(12) United States Patent
Mak et al.

(10) Patent No.: US 10,365,112 B2
(45) Date of Patent: Jul. 30, 2019

(54) METHOD AND APPARATUS FOR PROVIDING A ROUTE FORECAST USER INTERFACE

(71) Applicant: HERE Global B.V., Veldhoven (NL)

(72) Inventors: Oliver Mak, Kenmore, WA (US); Anatoliy Pochkin, Seattle, WA (US)

(73) Assignee: HERE Global B.V., Veldhoven (NL)

( * ) Notice: Subject to any disclaimer, the term of this patent is extended or adjusted under 35 U.S.C. 154(b) by 789 days.

(21) Appl. No.: 14/674,863

(22) Filed: Mar. 31, 2015

(65) Prior Publication Data
US 2016/0291820 A1 Oct. 6, 2016

(51) Int. Cl.
G06F 3/00 (2006.01)
G01C 21/34 (2006.01)
(Continued)

(52) U.S. Cl.
CPC ......... *G01C 21/34* (2013.01); *G01C 21/3423* (2013.01); *G01C 21/362* (2013.01); *G06Q 10/047* (2013.01); *G06Q 10/109* (2013.01)

(58) Field of Classification Search
CPC .. G01C 21/34; G01C 21/3423; G01C 21/362; G06Q 10/109; G06F 16/29; G06F 16/9537
See application file for complete search history.

(56) References Cited

U.S. PATENT DOCUMENTS 6,317,686 B1 * 11/2001 Ran ................... G01C 21/3691
701/117
7,747,645 B2 * 6/2010 Wahl .................... G06F 21/316
707/783
(Continued)

FOREIGN PATENT DOCUMENTS

WO 2014/013295 A1 1/2014

OTHER PUBLICATIONS

Engaged Drivers-Safe Drivers: Gathering Real-Time Data from Mobile and Wearable Devices for Safe-Driving Apps Fabius Steinberger, Ronald Schroeter, Diana Babiac; pp. 55-76.*
(Continued)

*Primary Examiner* — Nicholas Augustine
(74) *Attorney, Agent, or Firm* — Ditthavong & Steiner, P.C.

(57) ABSTRACT

An approach is provided for a route forecast user interface. The approach involves determining at least one target geographic point and at least one target time of arrival at the at least one target geographic point. The approach also involves causing, at least in part, a calculation of at least one reachability forecast with respect to one or more transportation parameters. The at least one reachability forecast indicates whether at least one user can reach the at least one target geographic point at the at least one target time from at least one starting location, at least one starting time, or a combination thereof with respect to the one or more transportation parameters. The approach further involves causing, at least in part, a generation of one or more representations of the at least one reachability forecast. The approach further involves causing, at least in part, a presentation of the one or more representations in at least one calendar-based user interface.

20 Claims, 11 Drawing Sheets

(51) Int. Cl.
*G01C 21/36* (2006.01)
*G06Q 10/10* (2012.01)
*G06Q 10/04* (2012.01)
*G06F 3/01* (2006.01)

(56) References Cited

U.S. PATENT DOCUMENTS

| | | | | |
|---|---|---|---|---|
| 8,000,694 | B2* | 8/2011 | Labidi | G01C 21/20 455/414.3 |
| 8,874,363 | B2* | 10/2014 | Bourne | G01C 21/20 701/400 |
| 9,615,202 | B2* | 4/2017 | Dal Santo | H04W 4/029 |
| 2001/0029425 | A1* | 10/2001 | Myr | G01C 21/3492 701/117 |
| 2007/0208498 | A1* | 9/2007 | Barker | G08G 1/0104 701/117 |
| 2009/0006994 | A1* | 1/2009 | Forstall | G01C 21/20 715/764 |
| 2009/0119001 | A1* | 5/2009 | Moussaeiff | G01C 21/005 701/532 |
| 2014/0046706 | A1 | 2/2014 | Goldstein et al. | |
| 2014/0229099 | A1 | 8/2014 | Garrett et al. | |
| 2014/0278086 | A1* | 9/2014 | San Filippo | G01C 21/3423 701/527 |
| 2014/0359456 | A1* | 12/2014 | Thiele | H04W 4/027 715/735 |
| 2014/0365126 | A1* | 12/2014 | Vulcano | G01C 21/36 701/533 |
| 2014/0365505 | A1* | 12/2014 | Clark | G06F 7/26 707/748 |
| 2015/0193379 | A1* | 7/2015 | Mehta | G10L 15/00 704/9 |
| 2015/0350843 | A1* | 12/2015 | Jensen | H04W 4/029 455/456.3 |
| 2016/0291820 | A1* | 10/2016 | Mak | G01C 21/34 |

OTHER PUBLICATIONS

"It's More Fun to Commute"—An Example of Using Automotive Interaction Design to Promote Well-Being in Cars Marc Hassenzahl, Matthias Laschke, Kai Eckoldt, Eva Lenz, Josef Schumann; pp. 95-120.*

* cited by examiner

METHOD AND APPARATUS FOR PROVIDING A ROUTE FORECAST USER INTERFACE

BACKGROUND

Service providers and developers are continually challenged to deliver value and convenience to consumers by, for example, providing compelling network services. One area of interest has been the development of navigation or routing services that enable users to generate and/or evaluate potential navigation routes. However, as the complexity and sophistication of such services increase, so do the number of available routing recommendations and choices available. The increased information load can potentially impose significant burdens on users to quickly comprehend and select from among available routing choices. Accordingly, service providers and developers face significant technical challenges to enable users to interact with routing services by providing routing information (e.g., such as reachability forecasts that predict when a user is expected to reach a potential destination) via user interfaces that may already be familiar to the users (e.g., a calendar-based user interface).

SOME EXAMPLE EMBODIMENTS

Therefore, there is a need for an approach for providing a route forecast user interface.

According to one embodiment, a method comprises determining at least one target geographic point and at least one target time of arrival at the at least one target geographic point. The method also comprises causing, at least in part, a calculation of at least one reachability forecast with respect to one or more transportation parameters. The at least one reachability forecast indicates whether at least one user can reach the at least one target geographic point at the at least one target time from at least one starting location, at least one starting time, or a combination thereof with respect to the one or more transportation parameters. The method further comprises causing, at least in part, a generation of one or more representations of the at least one reachability forecast. The method further comprises causing, at least in part, a presentation of the one or more representations in at least one calendar-based user interface.

According to another embodiment, an apparatus comprises at least one processor, and at least one memory including computer program code, the at least one memory and the computer program code configured to, with the at least one processor, cause, at least in part, the apparatus to determine at least one target geographic point and at least one target time of arrival at the at least one target geographic point. The apparatus also causes, at least in part, a calculation of at least one reachability forecast with respect to one or more transportation parameters. The at least one reachability forecast indicates whether at least one user can reach the at least one target geographic point at the at least one target time from at least one starting location, at least one starting time, or a combination thereof with respect to the one or more transportation parameters. The apparatus further causes, at least in part, a generation of one or more representations of the at least one reachability forecast. The apparatus further causes, at least in part, a presentation of the one or more representations in at least one calendar-based user interface.

According to another embodiment, a computer-readable storage medium carries one or more sequences of one or more instructions which, when executed by one or more processors, cause, at least in part, an apparatus to determine at least one target geographic point and at least one target time of arrival at the at least one target geographic point. The apparatus also causes, at least in part, a calculation of at least one reachability forecast with respect to one or more transportation parameters. The at least one reachability forecast indicates whether at least one user can reach the at least one target geographic point at the at least one target time from at least one starting location, at least one starting time, or a combination thereof with respect to the one or more transportation parameters. The apparatus further causes, at least in part, a generation of one or more representations of the at least one reachability forecast. The apparatus further causes, at least in part, a presentation of the one or more representations in at least one calendar-based user interface.

According to another embodiment, an apparatus comprises means for determining at least one target geographic point and at least one target time of arrival at the at least one target geographic point. The apparatus also comprises means for causing, at least in part, a calculation of at least one reachability forecast with respect to one or more transportation parameters. The at least one reachability forecast indicates whether at least one user can reach the at least one target geographic point at the at least one target time from at least one starting location, at least one starting time, or a combination thereof with respect to the one or more transportation parameters. The apparatus further comprises means for causing, at least in part, a generation of one or more representations of the at least one reachability forecast. The apparatus further comprises means for causing, at least in part, a presentation of the one or more representations in at least one calendar-based user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a route forecast user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to providing a route forecast user interface based on a reachability forecast between two calendar events, it is contemplated that the route forecast user interface may also recommend when a user should leave a starting location to reach an event at a target time of arrival.

In addition, although various embodiments are described with respect to determining a target geographic point and a target time of arrival from a calendar of a user, it is contemplated that a target geographic point and a target time of arrival may also be determined from one or more other applications of a user (e.g., a notepad application, a messaging application, an email application, or a combination thereof).

Figure 1A:
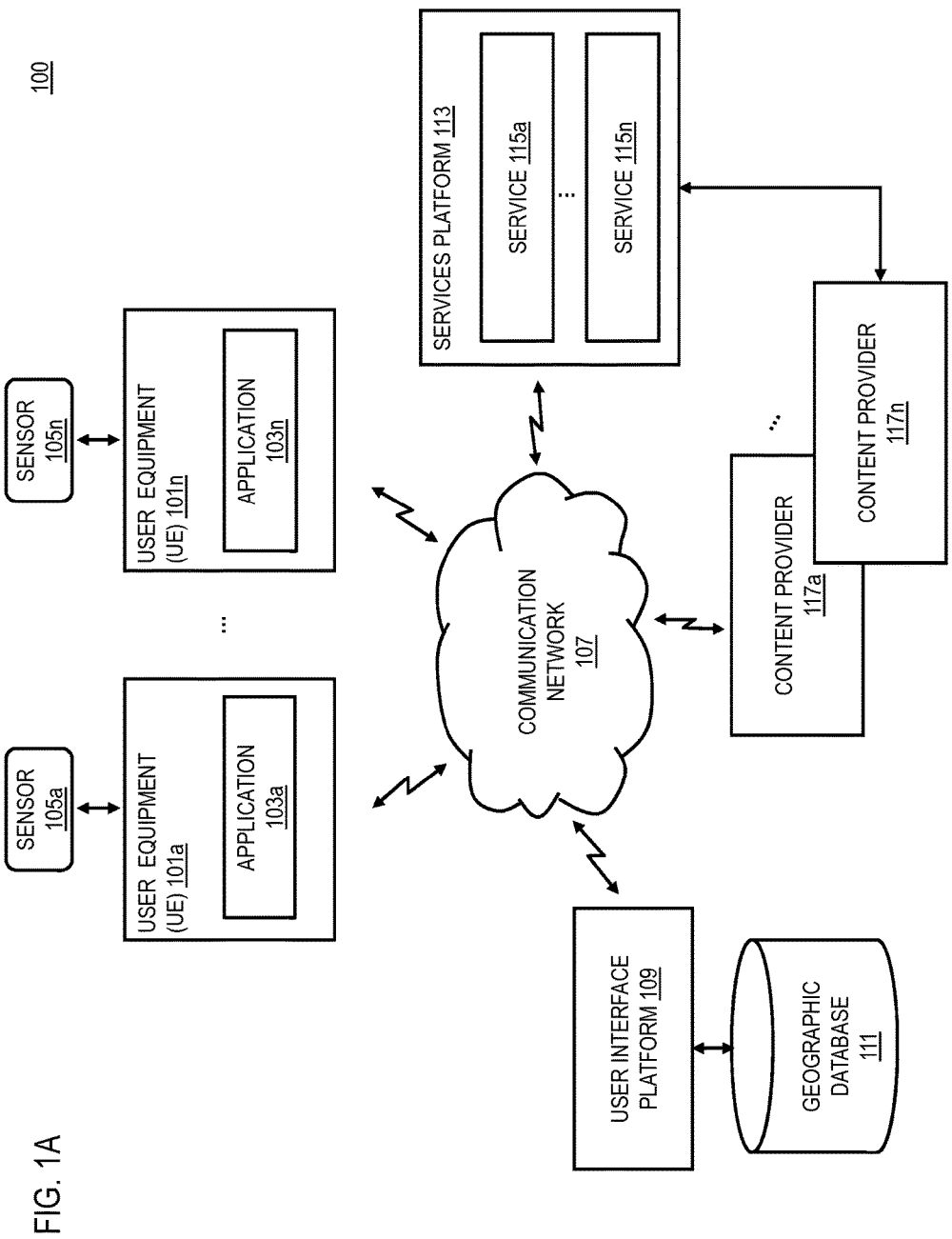
FIG. 1A is a diagram of a system capable of providing a route forecast user interface, according to one embodiment.
Figure 1B:
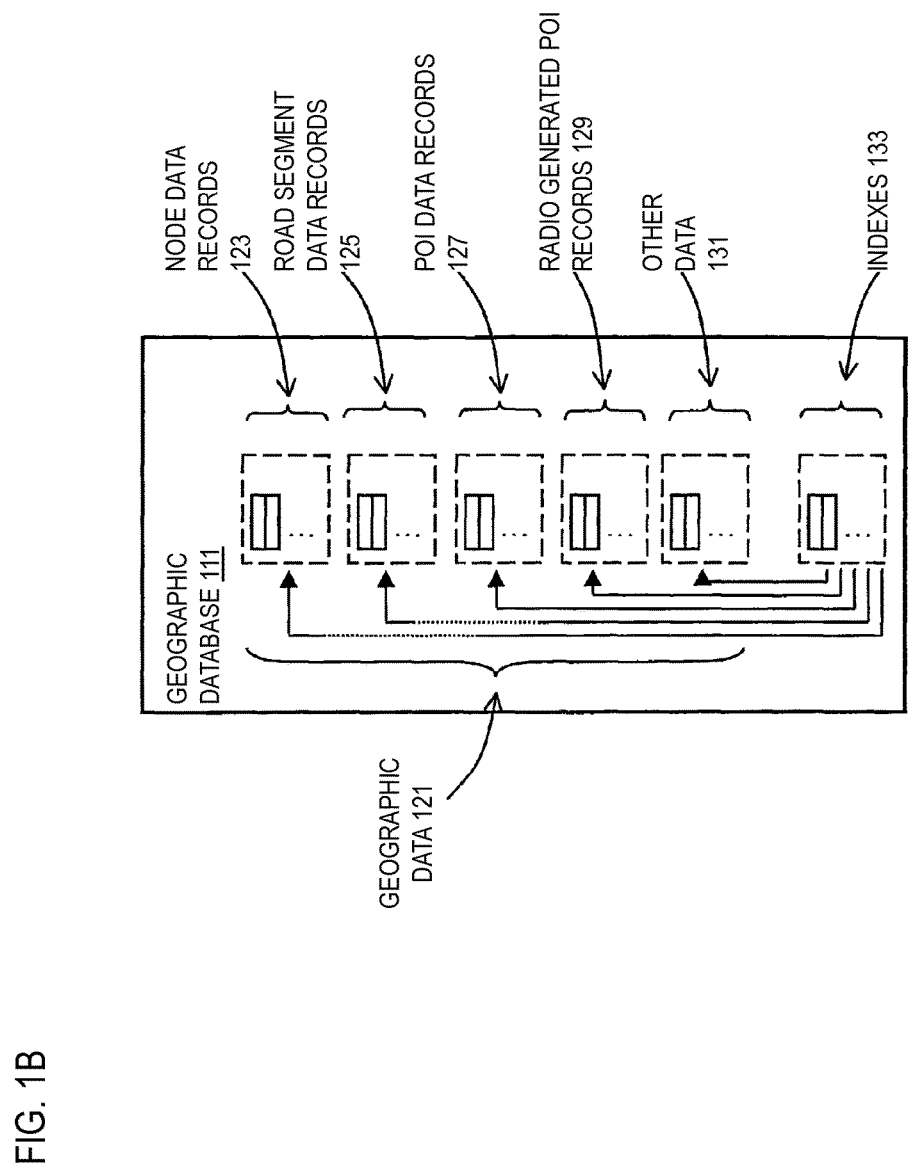
FIG. 1B is a diagram of the components of a geographic database platform 111, according to one embodiment.

FIG. 1 is a diagram of a system capable of providing a route forecast user interface, according to one embodiment. As noted above, one area of interest has been the development of navigation or routing services that enable users to generate and/or evaluate potential navigation routes. However, as the complexity and sophistication of such services increase, so do the number of available routing recommendations and choices available. The increased information load can potentially impose significant burdens on users to quickly comprehend and select from among multiple available routing choices. For example, since all transportation modes (e.g., walking, driving, public transportation) may be visually available at the same time to at least one user, it is not always obvious to the at least one user which transportation mode will ensure that he or she will reach at least one target geographic point at least one target time of arrival.

To address this problem, a system 100 of FIG. 1 introduces a route forecast user interface to give a user a quick calendar-based overview of a reachability forecast to at least one geographic point at a target time of arrival based on one or more travel parameters. In one embodiment, the system 100 determines at least one target geographic point (e.g., a dentist appointment) and at least one target time of arrival at the at least one target geographic point (e.g., at 1:00 p.m.). In one embodiment, the system 100 determines the at least one target geographic point and the at least one target time of arrival from at least one appointment scheduled in at least one calendar of the at least one user (e.g., a calendar-based application of at least one user's mobile device). In one embodiment, the system 100 may also determine the at least one target geographic point and at least one target time of arrival based, at least in part, on one or more other applications associated with a user (e.g., a notepad application, a messaging application, an email application, or a combination thereof).

In one embodiment, the system 100 causes, at least in part, a calculation of at least one reachability forecast with respect to one or more transportation parameters, wherein the reachability forecast indicates whether at least one user can reach the at least one target geographic point (e.g., a job interview) at the at least one target time (e.g., 2:00 p.m.) from at least one starting location (e.g., a dentist appointment), at least one starting time (e.g., 1:45 p.m.), or a combination thereof with respect to the one or more transportation parameters. The one or more transportation parameters may include, at least in part, one or more means of transport (e.g., walking, driving, using public transportation), one or more routing preferences (e.g., shortest distance, least traffic, fewest tolls, etc.), or a combination thereof. For example, with respect to the example use case discussed above, the system 100 may calculate that a user will likely reach his or her job interview on time if he or she leaves the dentist by 1:45 p.m. by car or by 1:30 p.m. by bus, but it is questionable whether the user will arrive on time if he or she decides to walk. In another example use case, where the at least one user only has one event scheduled in his or her calendar, the system 100 may recommend when the at least one user should leave his or her starting point (e.g., home) to reach a scheduled appointment (e.g., dinner at a restaurant) on time with respect to the one or more transportation parameters.

In one embodiment, the system 100 determines at least one starting point (e.g., dentist's office), at least one starting time (e.g., 1:45 p.m.), or a combination thereof from at least one other appointment scheduled in the at least one calendar (e.g., job interview), at least one current location of at least one user, at least one current time, at least one specified location, at least one specified time, or a combination thereof. As noted above, in one example use case, a user may have a dentist appointment scheduled in his or her calendar at 1:00 p.m. and a job interview scheduled at 2:00 p.m.

In one embodiment, the system 100 determines at least one recommended transportation parameter (e.g., driving or using public transportation) from among the one or more transportation parameters based, at least in part, on the at least one reachability forecast. As discussed, the system 100 may determine that driving or using public transportation are recommend modes of transportation in order for the user to reach his or her next appointment on time, but walking is not recommended given the amount of time required to reach the next destination by walking.

In one embodiment, the system 100 determines contextual information associated with travel between the at least one starting location and the at least one target geographic point, wherein the contextual information includes, at least in part, weather information, traffic information, or a combination thereof. For example, in the example use case discussed above, the system 100 may determine that it will likely rain in between appointments and, therefore, not recommend walking.

In one embodiment, the system 100 causes, at least in part, a generation of one or more representations of the at least one reachability forecast. For example, the system 100 may generate one or more visual clues to highlight the probability of a user reaching his or her destination in time using different modes of transportation (e.g., green "for sure;" yellow "maybe;" and red "highly unlikely"). In one embodiment, the system 100 determines at least one visual characteristic of the one or more representations based, at least in part, on the at least one reachability forecast, wherein the at least one visual characteristic includes, at least in part, a color (e.g., green, yellow, or red), an icon (e.g., a person, a car, or a bus), or a combination thereof. In one embodiment, the system 100 determines the color for the one or more representations by specifying a first color (e.g., green) as the color if the at least one user can reach the at least one target geographic point (e.g., job interview) earlier than a specified time period before the at least one target time (e.g., 20 minutes early); a second color (e.g., yellow) as the color if the at least one user can reach the at least one target geographic point later than the specified time period (e.g., 20 minutes early) but before the at least one target time (e.g., 10 minutes early); and a third color (e.g., red) as the color if the at least one user cannot reach the at least one target geographic point earlier than the at least one target time (e.g., 2:00 p.m.).

In one embodiment, the system 100 causes, at least in part, a presentation of the one or more representations in at least one calendar-based user interface. For example, as previously discussed, the system 100 may cause, at least in part, a presentation of one or more icons representing one or more modes of transportation (e.g., walking, driving, using public transportation) at the same time over a calendar event and representing the one or more icons as one or more color schemas based, at least in part, on the reachability forecast to give a user a quick overview of different transportation modes available to the at least one user.

In one embodiment, the system 100 causes, at least in part, a presentation of the one or more representations of the at least one reachability forecast between the at least one appointment (e.g., a dentist appointment) and the at least one other appointment (e.g., a job interview) in the at least one calendar-based user interface. For example, the system 100 may cause, at least in part, a representation of a car icon and a bus icon over a green bar between the times of 1:00 p.m. and 2:00 p.m. (e.g., at 1:45 p.m. and at 1:30 p.m., respectively) to inform a user of the respective time that he or she will need to leave the current destination to arrive at his or her next appointment on time.

In one embodiment, the system 100 enables the user to also interact with user interface elements representing different appointment slots in the calendar-based user interface to dynamically update the reachability forecasts and/or the representations of the reachability forecast. For example, a user can perform a touch and slide gesture on appointment to change an appointment time (e.g., starting time, ending time, duration, etc.). Based on the change in the appointment, the system 100 dynamically updates the reachability based on the new parameters indicated by the appointment change.

In one embodiment, the system 100 can also dynamically update the one or more representations as appointments are changed. By way of example, if an appointment is dragged so that it starts later relative to another appointment, a forecast that previously found that walking would not enable a user to reach the subsequent appointment on time can be updated to show that the later time now enables such a walking option. The system 100 then can update the visual representation of the reachability forecast for walking accordingly (e.g., changing the representation from red to green in color). In one embodiment, the system 100 also supports drag and drop operations to add or delete appointments. In a similar manner, the system 100 dynamically updates the reachability forecasts and associated representations as need appointments are added or existing appointments are deleted.

In one embodiment, the system 100 causes, at least in part, a presentation of the at least one recommended transportation parameter in the at least one calendar-based user interface. For example, the system 100 may cause, at least in part, a presentation of a car icon over the calendar at 1:45 p.m. and a bus icon over the calendar at 1:30 p.m. suggesting that if a user wants to leave his or her current appointment at the latest possible time and still arrive at his or her next appointment on time the user should drive rather than taking a bus. In one embodiment, the system 100 causes, at least in part, a presentation of the contextual information with or as part of the one or more representations. For example, the system 100 may cause, at least in part, a presentation of the current temperature or weather (e.g., rain or snow) so that a user may quickly determine whether walking is an option compared to driving or taking public transportation.

In one embodiment, the system 100 causes, at least in part, a presentation of the one or more representations as one or more interactive features in the at least one calendar-based user interface, wherein one or more interactions with the one or more interactive elements causes, at least in part, a presentation of information related to the at least one reachability forecast (e.g., "you should arrive at your next appointment 15 minutes early"), the one or more transportation parameters (e.g., "a one-way ticket on the bus costs $2.50"), or a combination thereof.

In one embodiment, the system 100 determines available time for reaching the at least one target geographic point at the at least one target time based, at least in part, on the at least one reachability forecast. For example, the system 100 may determine that if a user decides to drive to his or next appointment rather than walking, the at least one user will have enough time for lunch. In one embodiment, the system 100 determines one or more recommendation points of interest based, at least in part, on the available time (e.g., a place along a route between appointments where the at least one a user may have lunch).

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the user interface platform 109 via the communication network 107. In one embodiment, the user interface platform 109 performs the functions associated with providing a route forecast user interface.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user including touch-based interfaces, gesture-based user interfaces, voice-based interfaces, and/or any other available mode of interaction between a user and the UE 101. In addition, the UE 101 can be a "wearable" device or include "wearable" circuitry.

By way of example, the applications 103 may be any type of application that is executable at the UE 101, such as content provisioning services, location-based service applications, navigation applications, camera/imaging application, media player applications, social networking applications, calendar applications, and the like. In one embodiment, one of the applications 103 at the UE 101 may act as a client for the user interface platform 109 and perform one or more functions of the user interface platform 109. In one scenario, users are able to interact with one or more interactive elements in at least one calendar-based user application 103, wherein the one or more user interactions with the one or more interactive elements causes, at least in part, a presentation of information related to the at least one reachability forecast, the one or more transportation parameters, or a combination thereof.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.). In one scenario, the one or more sensors 105 may detect attributes for one or more modes of transportation. In another scenario, the UE 101 may have sensors tuned to detect characteristic aggregates of one or more modes of transport, whereby the sensor data may be calculated either on the cloud or by the UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The services platform 113 may include any type of service. By way of example, the services platform 113 may include content (e.g., audio, video, images, etc.) provisioning services, application services, storage services, contextual information determination services, location-based services, social networking services, information (e.g., weather, news, traffic, etc.) based services, etc. In one embodiment, the services platform 113 may interact with the UE 101, the user interface platform 109 and the content provider 117a-117n (hereinafter content provider 117) to supplement or aid in the processing of the content information.

By way of example, services 115a-115n (hereinafter services 115) may be an online service that reflects interests and/or activities of users. In one scenario, the services 115 provide representations of each user (e.g., a profile), his/her social links, and a variety of additional information. The services 115 allow users to share media information, location information, activities information, contextual information, and interests within their individual networks, and provides for data portability.

The content provider 117 may provide content to the UE 101, the user interface platform 109, and the services 115 of the services platform 113. The content provided may be any type of content, such as image content, video content, audio content, textual content, etc. In one embodiment, the content provider 117 may provide content that may supplement content of the applications 103, the sensors 105, or a combination thereof. By way of example, the content provider 117 may provide content that may aid in causing a generation of at least one request to capture at least one content presentation. In one embodiment, the content provider 117 may also store content associated with the UE 101, the user interface platform 109, and the services 115 of the services platform 113. In another embodiment, the content provider 117 may manage access to a central repository of data, and offer a consistent, standard interface to data, such as a repository of users' navigational data content.

For example, the geographic database 111 includes node data records 123, road segment or link data records 125, POI data records 127, and other data records 131. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, or paths, as can be used in the calculated route or recorded route information for processing status information for one or more points of interest to determine the changes for generation of various representations for presenting in a user interface, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include and/or be associated with event data (e.g., traffic incidents, constructions, scheduled events, unscheduled events, etc.) associated with the POI data records 127 or other records of the geographic database 111.

The geographic database 111 can be maintained by the content provider 117 (e.g., a map developer) in association with the services platform 107. By way of example, the map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database 111 can be a master geographic database, but in alternate embodiments, the client side geographic database 111 can represent a compiled navigation database that can be used in or with end user devices (e.g., UEs 101) to provide navigation and/or map-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 and/or 113 through a wireless or wired connection (such as via a server and/or the communication network 119), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation and map functions such as guidance and map display, for example, and for determination of one or more personalized routes or route segments based on one or more calculated and recorded routes, according to exemplary embodiments.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
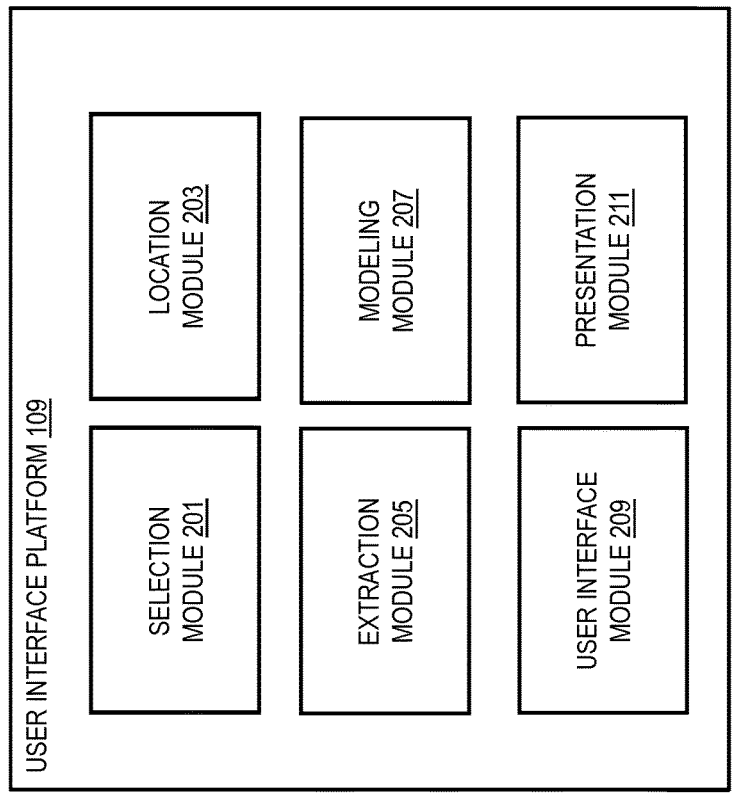
FIG. 2 is a diagram of the components of a user interface platform 109, according to one embodiment

FIG. 2 is a diagram of the components of a user interface platform 109, according to one embodiment. By way of example, the user interface platform 109 includes one or more components for processing routing information for generation of various representations for presenting in a user interface. It is contemplated that the functions of these components may be combined in one or more components or performed by other components of equivalent functionality. In one embodiment, the user interface platform 109 includes a selection module 201, a location module 203, an extraction module 205, a modeling module 207, a user-interface module 209, and a presentation module 211.

In one embodiment, the selection module 201 is used to determine contextual information from, for example, the content providers 117 associated with travel between the at least one starting and the at least one geographic point (e.g., weather information, traffic information, or a combination thereof). For example, the selection module 201 may determine that at least one user's preferred route preference (e.g., quickest) is likely to be affected by traffic delays between the time of the at least one user's current appointment and the user's next appointment. The selection module 201 may also be used to determine at least one visual characteristic of the one or more representations (e.g., a color, an icon, or a combination thereof) based, at least in part, on the at least one reachability forecast.

In one embodiment, the location module 203 in connection with the extraction module 205 and the user-interface module 209 is used to determine the at least one starting point, the at least one starting time, or a combination from at least one other appointment scheduled in the at least one calendar (e.g., a calendar application 103), at least one current location of the at least one user, at least one current time, at least one specified location, at least one specified time, or a combination thereof. For example, the location module 203 may determine the at least one current location of the at least one user, the at least one current time, or a combination thereof based on a sensor 105 of the UE 101 (e.g., GPS).

The extraction module 205 in certain embodiments is used to determine at least one target geographic point (e.g., a job interview) and at least one target time of arrival at the at least one geographic point (e.g., 2:00 p.m.). The extraction module 205 may also be used to determine the at least one geographic point and the at least one target time of arrival from at least one appointment scheduled in at least one calendar of at least one user (e.g., an appointment scheduled in a calendar application 103). In one embodiment, the extraction module 205 can respond to dynamic updates to the appointments scheduled in the calendar. For example, the extraction module 205 can monitor when a user updates, adds, deletes, and/or otherwise modifies calendar appointments. As previously discussed, the updates, additions, deletions, and/or other modifications to existing calendar entries can be through a touch-based interaction through a calendar-based user interface (e.g., by a touch and slide gesture, a drag gesture, a drop gesture, etc.)

In one embodiment, the modeling module 207 is used, in connection with the extraction module 205 and the selection module 201, to cause, at least in part, a calculation of at least one reachability forecast with respect to one or more transportation parameters, wherein the at least one reachability forecast indicates whether the at least one user can reach the at least one target geographic point at the at least one target time from at least one starting location, at least one starting time, or a combination thereof with respect to the one or more transportation parameters. For example, the modeling module 207 may calculate that at least one user will likely reach his or her job interview on time if he or she leaves his or her dentist appointment at 1:45 p.m. by car or at 1:30 p.m. by bus, but it is questionable whether the at least one user will arrive on time if he or she decides to walk.

The modeling module 207 may also be used to determine at least one recommended transportation parameter (e.g., one or more means of transportation) based, at least in part, on the at least one reachability forecast. For example, during a rainy day, the modeling module 207 may determine that walking is not a recommended means of transport. The modeling module 207 also may be used to determine available time for reaching the at least one target geographic point at the least one target time based, at least in part, on the at least one reachability forecast. For example, the modeling module 207 may calculate at least one user's current speed of travel relative to the distance he or she is required to travel to arrive at the at least one target geographic point (e.g., job interview) at the at least one target time. The modeling module 207, in connection with the location module 203, may also be used to determine one or more recommendation points of interest based, at least in part, on the available time. For example, the modeling module 207 may determine that the at least one user has approximately an hour between appointments and that the at least one user will pass by a number of restaurants during lunch time along the way to his or her next appointment. In one embodiment, the modeling module dynamically updates reachability forecasts, recommendations, etc. as appointments are dynamically changed by a user.

The user-interface module 209 in certain embodiments is used, in connection with the location module 203, to determine at least one specified location, at least one specified time, or a combination thereof. For example, user-interface module 209 may be used to determine an assignment of a particular location as at least one user's home location (e.g., using a UE 101). The user-interface module 209 may also be used to specify a first color (e.g., green) as the color if at least one user can reach the at least one target point earlier than a specified time period before the at least one time; a second color (e.g., yellow) as the color if the at least one user can reach the at least one target geographic point later than a specified time period but before the at least one target time; and a third color (e.g., red) as the color if the at least one user cannot reach the at least one target geographic point earlier than the at least one target time. The user-interface module 209 also may be used in connection with the presentation module 211 to cause, at least in part, a presentation of the one or more representations in at least one calendar-based user interface (e.g., a graphical user interface (GUI)). The user-interface module 209 may also be used in connection with the presentation module 211 to cause, at least in part, a presentation of the one or more representations as one or more interactive elements in the at least one calendar-based user interface.

In one embodiment, the presentation module 211 is used to cause, at least in part, a generation of one or more representations of the at least one reachability forecast. For example, the presentation module 211 may generate one or more visual clues to highlight the probability of at least one user reaching his or her destination in time using different modes of transportation (e.g., green "for sure;" yellow "maybe;" and red "highly unlikely"). The presentation module 211 may also be used to cause, at least in part, a presentation of the one or more representations in at least one calendar-based user interface (e.g., a calendar application 103). The presentation module 211 also may be used to cause, at least in part, a presentation of the one or more representations of the at least one reachability forecast (e.g., a color, an icon, or a combination thereof) between the at least one appointment and the at least one other appointment in the at least one calendar-based user interface. In one embodiment, the presentation module 211 may dynamically update the representations of the reachability forecast as appointments or other system parameters are dynamically changed by a user.

The presentation module 211 may also be used to cause, at least in part, a presentation of the at least one recommended transportation parameter (e.g., walking between appoints due to proximity and traffic) in the at least one calendar-based user interface. The presentation module 211 also may be used to cause, at least in part, a presentation of the contextual information (e.g., temperature, weather, etc.) with or as part of the one or more representations. Further, the presentation module 211 may be used in connection with the user-interface module 209 to cause, at least in part, a presentation of the one or more representations as one or more interactive elements in the at least one calendar-based user interface.

Figure 3:
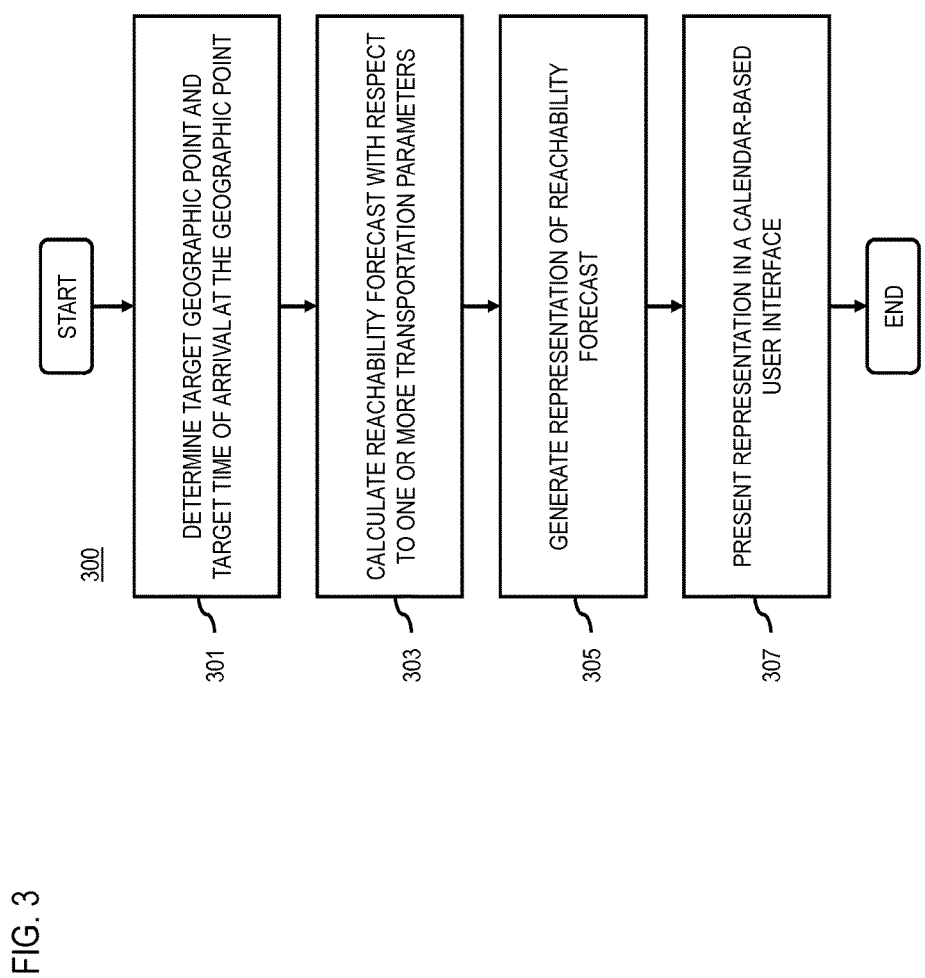
FIG. 3 is a flowchart of a process for providing a route forecast user interface, according to one embodiment.
Figure 9:
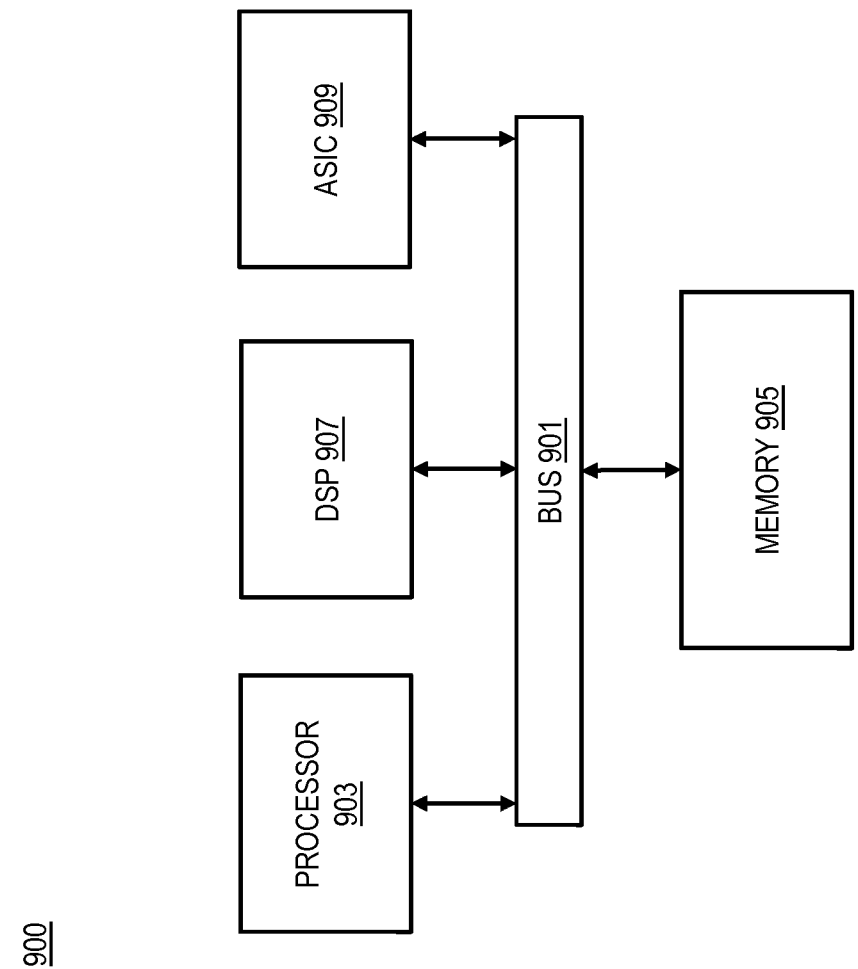
FIG. 9 is a diagram of a chip set that can be used to implement an embodiment of the invention.

FIG. 3 is a flowchart of a process for providing a route forecast user interface, according to one embodiment. In one embodiment, the user interface platform 109 performs the process 300 and is implemented in, for instance, a chip set including a processor and a memory as shown in FIG. 9. In addition or alternatively, the application 103 may perform all or a portion of the process 300.

In step 301, the user interface platform 109 determines at least one target geographic point and at least one target time of arrival at the at least one target geographic point. By way of example, the at least one target geographic point may be an appointment (e.g., a dentist appointment) entered into a calendar of a user (e.g., a calendar application 103) and the target time of arrival may be the time of the appointment indicated in the calendar (e.g., 1:00 p.m.).

In step 303, the user interface platform 109 causes, at least in part, a calculation of at least one reachability forecast with respect to one or more transportation parameters, wherein the at least one reachability forecast indicates whether at least one user can reach the at least one target geographic point at the at least one target time from at least one starting location, at least one starting time, or a combination thereof with respect to the one or more transportation parameters. By way of example, the user interface platform 109 may calculate that at least one user will likely reach his or her next appointment (e.g., a job interview) on time if he or she leaves his or her current appointment (e.g., a dentist appointment) at 1:45 by car or at 1:30 by buss, but it is questionable as to whether the user will arrive on time if he or she decides to walk. In another example use case, where at least one user only has one event scheduled in his or her calendar, the user interface platform 109 may recommend when the at least one user should leave his or her starting point (e.g., home) to reach a scheduled appointment (e.g., a dinner with a friend) on time with respect to one or more transportation parameters (e.g., a means of transportation).

In step 305, the user interface platform 109 causes, at least in part, a generation of one or more representations of the at least one reachability forecast. By way of example, the user interface platform 109 may generate one or more visual clues to highlight the probability of a user reaching his or her destination in time using different modes of transportation such as walking, driving, taking public transportation, etc. (e.g., green "for sure;" yellow "maybe;" and red "highly unlikely").

In step 307, the user interface platform 109 causes, at least in part, a presentation of the one or more representations in at least one calendar-based user interface. By way of example, the user interface platform 109 may cause a presentation of a car icon over a calendar entry at 1:45 p.m. and a bus icon over the calendar entry at 1:30 p.m. suggesting that if at least one user wants to leave his or her current appointment (e.g., a dentist appointment) at the latest possible time and still arrive at his or her next appointment (e.g., a job interview) on time, the at least one user should drive rather than taking a bus.

Figure 4:
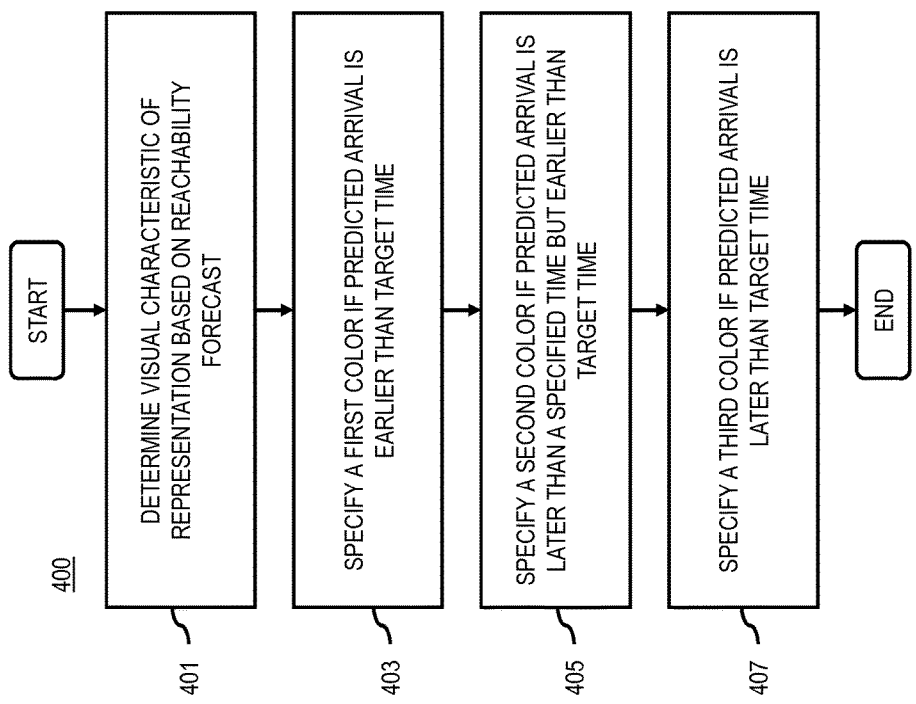
FIG. 4 is a flowchart of a process for determining visual characteristics of a route forecast user interface based on reachability, according to one embodiment.

FIG. 4 is a flowchart of a process for determining visual characteristics of a route forecast user interface based on reachability, according to one embodiment. In one embodiment, the user interface platform 109 performs the process 400 and is implemented in, for instance, a chip set including a processor and a memory as shown in FIG. 9.

In step 401, the user interface platform 109 determine at least one visual characteristic of the one or more representations based, at least in part, on the at least one reachability forecast, wherein the at least one visual characteristic includes, at least in part, in part a color, an icon, or combination thereof. By way of example, the color may be green, yellow, or red depending on the probability of at least one user reaching his or her destination on time and the icon may be a person walking, a car, a bus or other forms of public transportation (e.g., a subway or ferry). In addition to different colors, it is contemplated that the user interface platform 109 may represent the reachability forecast with different shades or gradations of color.

In step 403, the user interface platform 109 determines the color for the one or more representations by specifying a first color as the color if at least one user can reach the at least one target geographic point earlier than a specified time period before the at least one target time. By way of example, the first color may be green and the specified time period before the at least one target time may be 20 minutes early (i.e., ample time should the at least one user experience minor traffic or delays along the way).

In step 405, the user interface platform 109 determines the color for the one or more representations by specifying a second color as the color if the at least one user can reach the at least one target geographic point later than a specified time period but before the at least one target time. By way of example, the second color may be yellow and the later than the specified time period (e.g., 20 minutes) but before the least one target time may be 10 minutes (i.e., time for at least one user to find parking or grab a cup of coffee, for example, but not much else before the target time).

In step 407, the user interface platform 109 determines the color for the one or more representations by specifying a third color as the color if the at least one user cannot reach the at least one target geographic point earlier than the at least one target time. By way of example, the third color may be red, which could represent any period of time from the target time and after (e.g., 10 minutes late).

Figure 5:
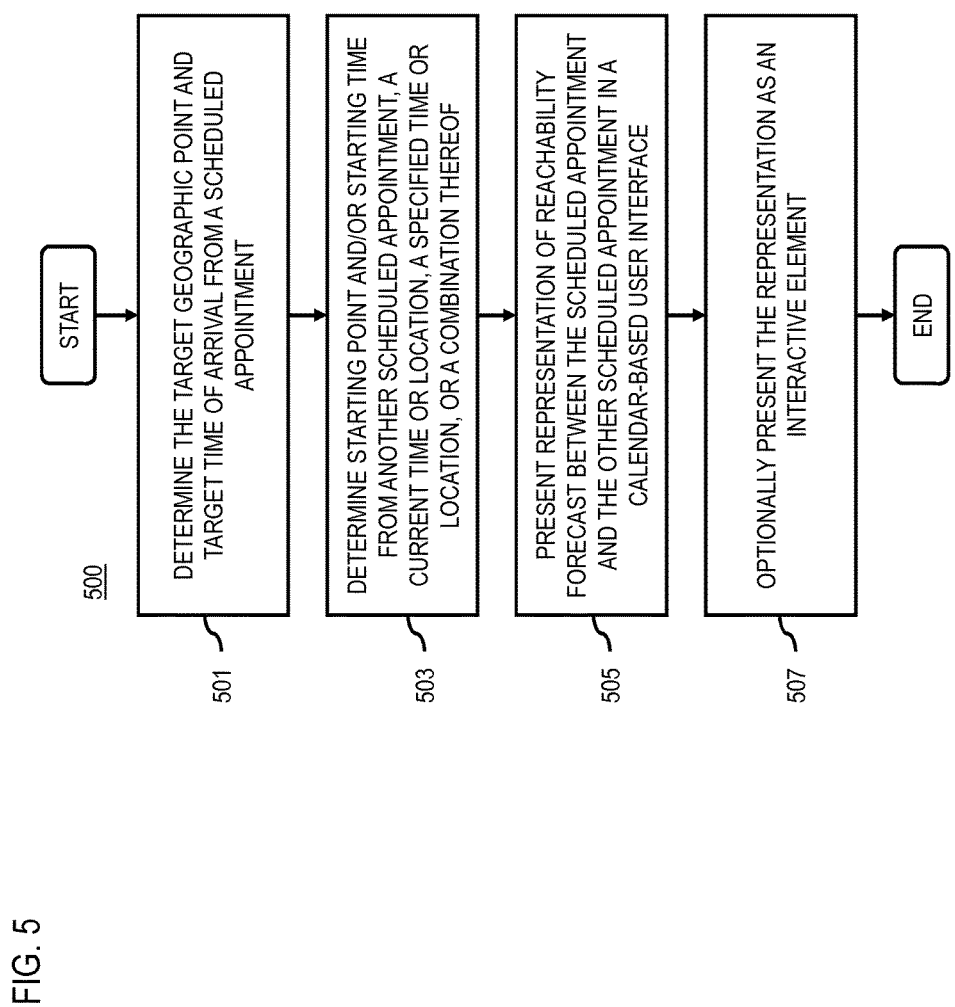
FIG. 5 is a flowchart of a process for extracting a target geographic point and a target time of arrival from a calendar of a user, according to one embodiment.

FIG. 5 is a flowchart of a process for extracting a target geographic point and a target time of arrival from a calendar of a user, according to one embodiment. In one embodiment, the user interface platform 109 performs the process 500 and is implemented in, for instance, a chip set including a processor and a memory as shown in FIG. 9.

In step 501, the user interface platform 109 determines the at least one target geographic point and the at least one target time of arrival from at least one appointment scheduled in at least one calendar of at least one user. By way of example, the at least one calendar may be a calendar application on a user equipment (e.g., at least one mobile device).

In step 503, the user interface platform 109 determines the at least one starting point, the at least one starting time, or a combination thereof from at least one other appointment scheduled in the at least one calendar, at least one current location of the at least one user, at least one current time, at least one specified location, at least one specified time, or a combination thereof. By way of example, at least one user may have a first appointment scheduled in his or calendar for 1:00 p.m. (dentist appointment) and a second appointment scheduled in his or her calendar for 2:00 p.m. (job interview). The at least one user may have also inputted the address of each of these locations along with the calendar entry. If the at least one user has his or her mobile device on hand at the time, the user interface platform 109 may also be able to determine the at least one user's current location based on cellular triangulation, for example.

In step 505, the user interface platform 109 causes, at least in part, a presentation of the one or more representations of the at least one reachability forecast between the at least one appointment and the at least one other appointment in the at least one calendar-based user interface. By way of example, the user interface platform 109 may cause, at least in part, a presentation of a car icon and a bus icon over a green bar between the times of 1:00 p.m. and 2:00 p.m. (e.g., at 1:45 p.m. and at 1:30 p.m., respectively) to inform at least one user of the respective times that he or she will need to leave his or her current destination to arrive at his or her next appointment on time. At the same time, the user interface platform 109 may also cause, at least in part, a presentation of a walking icon in yellow over the green bar to indicate that it is not recommended to walk to the next appointment since there may not be enough time, the weather may be inclement, or a combination thereof.

In step 507, the user interface platform 109 optionally causes, at least in part, a presentation of the one or more representations as one or more interactive elements in the at least one calendar-based user interface, wherein one or more user interactions with the one or more interactive elements causes, at least in part, a presentation of information related to the at least one reachability forecast, the one or more transportation parameters, or a combination therefore. By way of example, if at least one user taps, for example, on a car icon, the user interface platform 109 may generate information such as "you should arrive at your next appointment 15 minutes early" or "use an alternative route to avoid traffic on your normal route." In another example use case, if at least one user taps, for example, on a bus icon, the user interface platform 109 may generate information such as "a one-way ticket on the bus costs $2.50" or "Bus A1 leaves every ten minutes from the bus stop."

Figure 6:
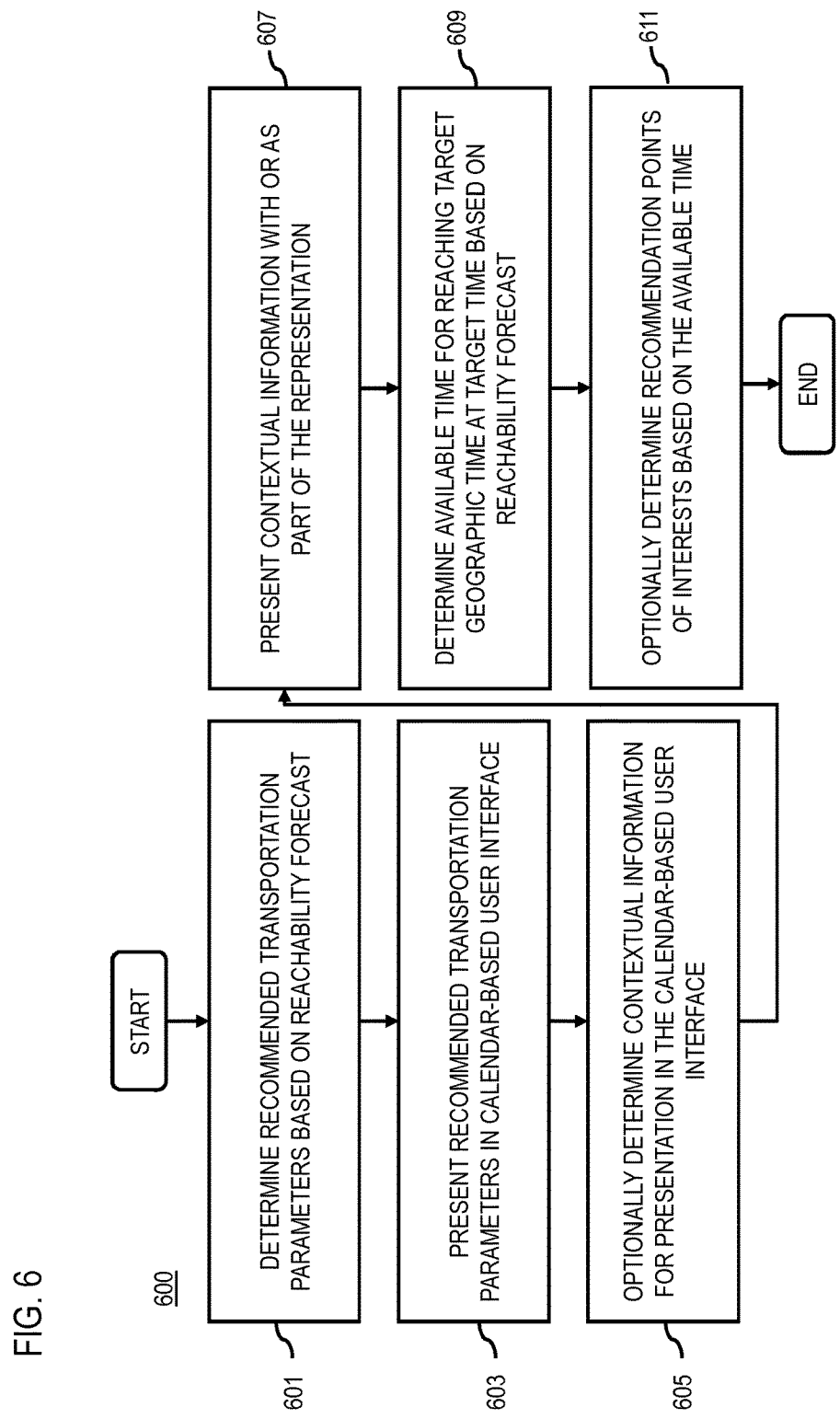
FIG. 6 is a flowchart of a process for recommending transportation parameters in a route forecast user interface based on reachability, contextual information, and/or available time, according to one embodiment.

FIG. 6 is a flowchart of a process for recommending transportation parameters in a route forecast user interface based on reachability, contextual information, and/or available time, according to one embodiment. In one embodiment, the user interface platform 109 performs the process 600 and is implemented in, for instance, a chip set including a processor and a memory as shown in FIG. 9.

In step 601, the user interface platform 109 determines at least one recommended transportation parameter from among the one or more transportation parameters based, at least in part, on the at least one reachability forecast. By way of example, the user interface platform 109 may determine that driving or using public transportation (e.g., taking a bus) are recommended modes of transportation for at least one user to reach his or her next appointment (e.g., a job interview) on time, but walking is not recommended given the time required to reach the next destination.

In step 603, the user interface platform 109 causes, at least in part, a presentation of the at least one recommended transportation parameter in the at least one calendar-based user interface. By way of example, the user interface platform 109 may cause, at least in part, a presentation of a car icon over the calendar at 1:45 p.m. and a bus icon over the calendar at 1:30 p.m. suggesting that if at least one user wants to leave his or her current appointment at the latest possible time and still arrive at his or her next appointment on time, the at least one user should drive rather than taking a bus.

In step 605, the user interface platform 109 optionally determines contextual information associated with travel between the starting location and the at least one starting location and at least one target geographic point, wherein the contextual information includes, at least in part, weather information, traffic information, or a combination thereof. In step 607, the user interface platform 109 causes, at least in part, a presentation of the contextual information with or as part of the one or more representations. By way of example, the user interface platform 109 may recommend driving or taking public transportation rather than walking between appointments because of the outside temperature (too hot and/or too cold) or because of inclement weather. Likewise, the user interface platform 109 may recommend taking public transportation rather than driving between appointments because of traffic affecting the at least one user's route to the appointment.

In step 609, the user interface platform 109 determines available time for reaching the at least one target geographic point at the at least one target time based, at least in part, on the at least one reachability forecast. By way of example, the user interface platform 109 may determine that if at least one user decides to drive to his or her next appointment rather than walking, for example, that he or she will have enough time for lunch before the next appointment. In step 611, the user interface platform 109 optionally determines one or more recommendation points of interest based, at least in part, on the available time. By way of example, the user interface platform 109 may recommend a restaurant along a route between appointments based on the available time (e.g., fast food for a short time window or a sit down restaurant for a longer time window).

Figure 7:
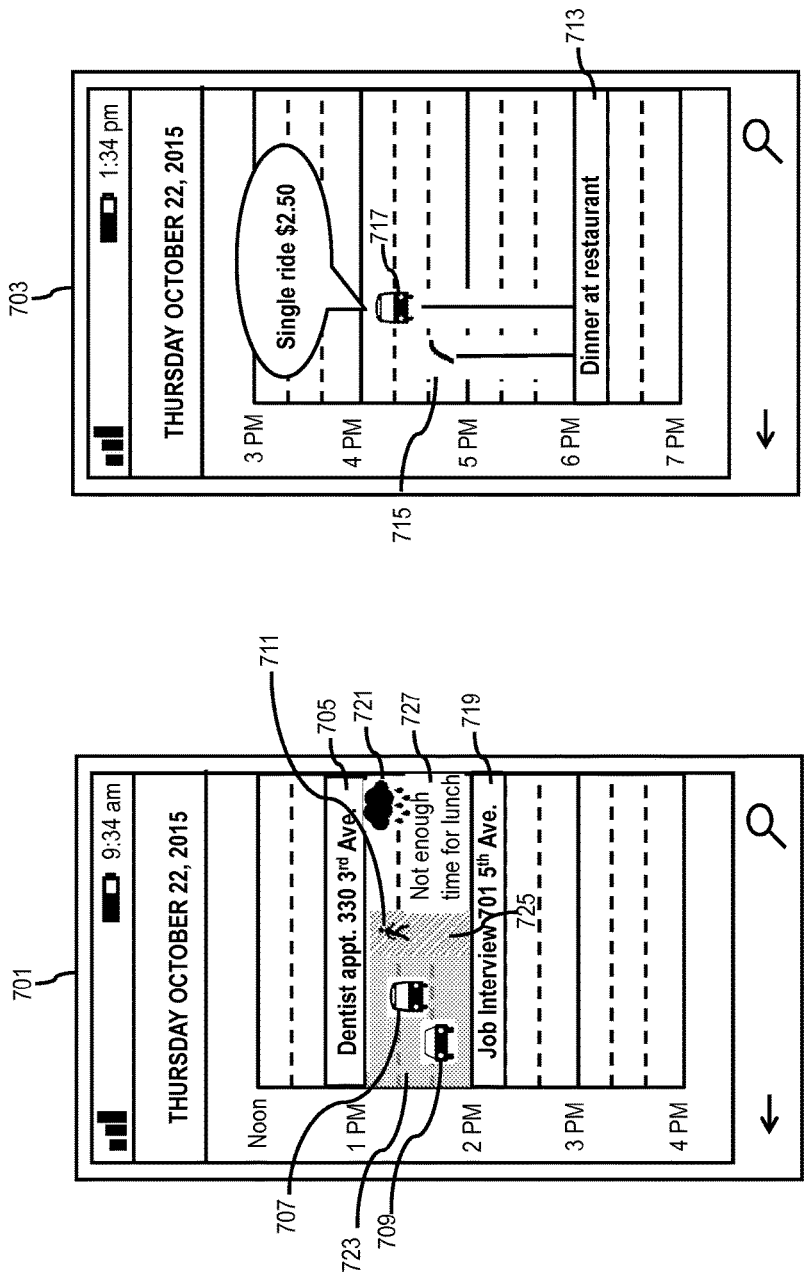
FIG. 7 is a diagram of user interfaces utilized in the processes of FIGS. 3-6, according to one embodiment.

FIG. 7 is a diagram of user interfaces utilized in the processes of FIGS. 3-6, according to various embodiments. As shown, the example user interfaces of FIG. 7 include one or more user interface elements and/or functionalities created and/or modified based, at least in part, on information, data, and/or signals resulting from the processes (e.g., processes 300, 400, 500, and 600) described with respect to FIGS. 3-6. More specifically, FIG. 7 illustrates two user interfaces (e.g., interfaces 701 and 703) depicting one or more representations of one or more items (e.g., calendar entries and corresponding reachability forecast information) in a calendar-based user interface.

In one embodiment, the system 100 determines at least one target geographic point (e.g., 330 3$^{rd}$ Avenue) and at least one target time of arrival at the at least one target geographic point (e.g., 1 p.m.). More specifically, in one embodiment, the system 100 determines the at least one target point and the at least one target time of arrival from at least one appointment in at least one calendar of at least one user (e.g., calendar appointment 705).

In one embodiment, the system 100 causes, at least in part, a calculation of at least one reachability forecast with respect to one or more transportation parameters, wherein the reachability forecast indicates whether at least one user can reach the at least one target geographic point (e.g., a job interview) at the at least one target time (e.g., 2:00 p.m.) from at least one starting location (e.g., a dentist appointment at 330 3$^{rd}$ Ave.), at least one starting time (e.g., 1:30 p.m. by bus as depicted by icon 707 or 1:45 as depicted by icon 709), or a combination thereof with respect to the one or more transportation parameters. For example, the system 100 may calculate that at least one user is likely to reach his or her job interview at 2:00 p.m. if he or she leaves the dentist at 1:45 by car or at 1:30 by bus, but it is questionable whether the user will arrive on time if he or she walks as depicted by the icon 711. In another embodiment, where the user only has one event scheduled in his or her calendar (e.g., appointment 713 of interface 703), the system 100 may recommend when the at least one user should leave his or her starting point (e.g., home) to reach the scheduled appointment (e.g., dinner at a restaurant) on time with respect to the one or more transportation parameters (e.g., car 715 or bus 717).

In one embodiment, the system 100 determines at least one starting point (e.g., 330 3$^{rd}$ Ave.), at least one starting time (e.g., 1:30 p.m. by bus or 1:45 by car), or a combination thereof from at least one other appointment scheduled in the at least one calendar (e.g., calendar appointment 719 for a job interview), at least one current location of the at least one user, at least one current time, at least one specified location, at least one specified time, or a combination thereof. By way of example, the system 100 may determine that if at least one user wants to drive to his or her job interview, then the user should leave by 1:45 from his or her dentist's office.

In one embodiment, the system 100 determines at least one recommended transportation parameter from among the one or more transportation parameters based, at least in part, on the at least one reachability forecast. For example, the system 100 may determine that driving (icon 709) or taking public transportation (icon 707) are recommended modes of transportation in order for the at least one user to reach his or her next appointment (e.g., appointment 719), but walking (icon 711) is not recommended given the time required to reach the next destination. In one embodiment, the system 100 may also determine contextual information associated with travel between the at least one starting location (e.g., a dentist appointment) and the at least one target geographic point (e.g., a job interview). By way of example, the system 100 may determine that at the desired time of travel it will be raining as depicted by the weather icon 721. As a result, the system 100 may not recommend walking (icon 711) between appointments (e.g., appointments 705 and 719).

In one embodiment, the system 100 causes, at least in part, a generation of one or more representations of the at least one of reachability forecast as depicted in UIs 701 and 703. In one embodiment, the system 100 determines at least one visual characteristic of the one or more representations based, at least in part, on the at least one reachability forecast, wherein the at least one visual characteristic includes, at least in part, a color (e.g., green as represented by the semi-transparent color block 723, yellow as represented by the hatched color block 725, or red), an icon (e.g., icons 707, 709, 711, 715, and 717), or a combination thereof. In one embodiment, the system 100 determines the color for the one or more representations by specifying a first color (e.g., green as represented by the semi-transparent color block 723) as the color if at least one user can reach the target geographic point (e.g., job interview 719) earlier than a specified time period before the at least one target time (e.g., 20 minutes early); a second color (e.g., yellow as represented by the hatched color block 725) as the color if the user can reach the job interview 719, for example, later than the specified time period, but before the at least one target time (e.g., 10 minutes early); and a third color (e.g., red) as the color if the at least one user cannot reach the job interview 719, for example, earlier than the at least one target time (e.g., 2:00 p.m.).

In one embodiment, the system 100 causes, at least in part, a presentation of the one or more representations in at least one calendar-based user interface (e.g., interfaces 701 and 703). In one embodiment, the system 100 causes, at least in part, a presentation of the one or more representations of the at least one reachability forecast (e.g., the semi-transparent color block 723 associated with the car icon 709 and the bus icon 707 and the hatched color block 725 associated with the walking icon 711) between the at least one appointment (e.g., dentist appointment 705) and the at least one other appointment (e.g., job interview 719) in the at least one calendar-based user interface (e.g., interface 701).

In one embodiment, the system 100 causes, at least in part, a presentation of the at least one recommended transportation in the at least one calendar-based user interface (e.g., interfaces 701 and 703). For example, with respect to interface 701, the system 100 recommends either driving (icon 709) or taking public transportation (icon 707) as highlighted by the semi-transparent color block 723 compared to walking (icon 711) as highlighted by the hatched color block 725. In one embodiment, the system 100 causes, at least in part, a presentation of the contextual information (e.g., cloud icon 721) with or as part of the one or more representations.

In one embodiment, the system 100 causes, at least in part, a presentation of the one or more representation as one or more interactive features (e.g., icons 715 and 717) in the at least one calendar-based user interface (e.g., interface 703). For example, when a user interacts with the bus icon 717 (e.g., by tapping), the system 100 causes, at least in part, a presentation of information related to the at least one reachability forecast, the one or more transportation parameters (e.g., "a single ride is $2.50"), or a combination thereof.

In one embodiment, the system 100 determines available time for reaching the at least one target geographic point at the at least one target time based, at least in part, on the at least one reachability forecast. For example, the information bubble 727 indicates to at least one user that there is not enough time to eat lunch to make the job interview 719 on time. In one embodiment, the system 100 determines one or more recommendation points of interest (e.g., a flower shop on route to the dinner at a restaurant 713) based, at least in part, on the available time.

The processes described herein for providing a route forecast user interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
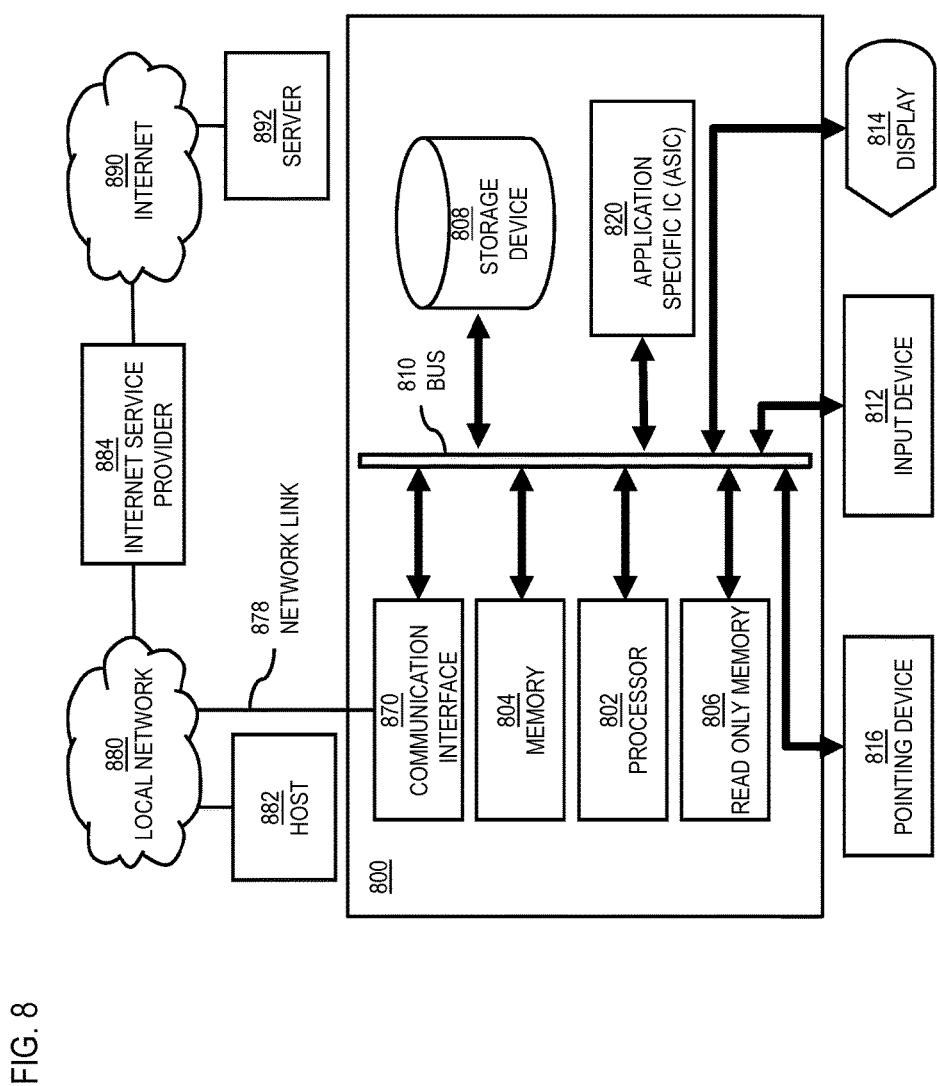
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide a route forecast user interface as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing a route forecast user interface.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a route forecast user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing a route forecast user interface. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a route forecast user interface, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for providing a route forecast user interface to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide a route forecast user interface as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing a route forecast user interface.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a route forecast user interface. The memory 905 also stores the data associated with or generated by the execution of the inventive steps.

Figure 10:
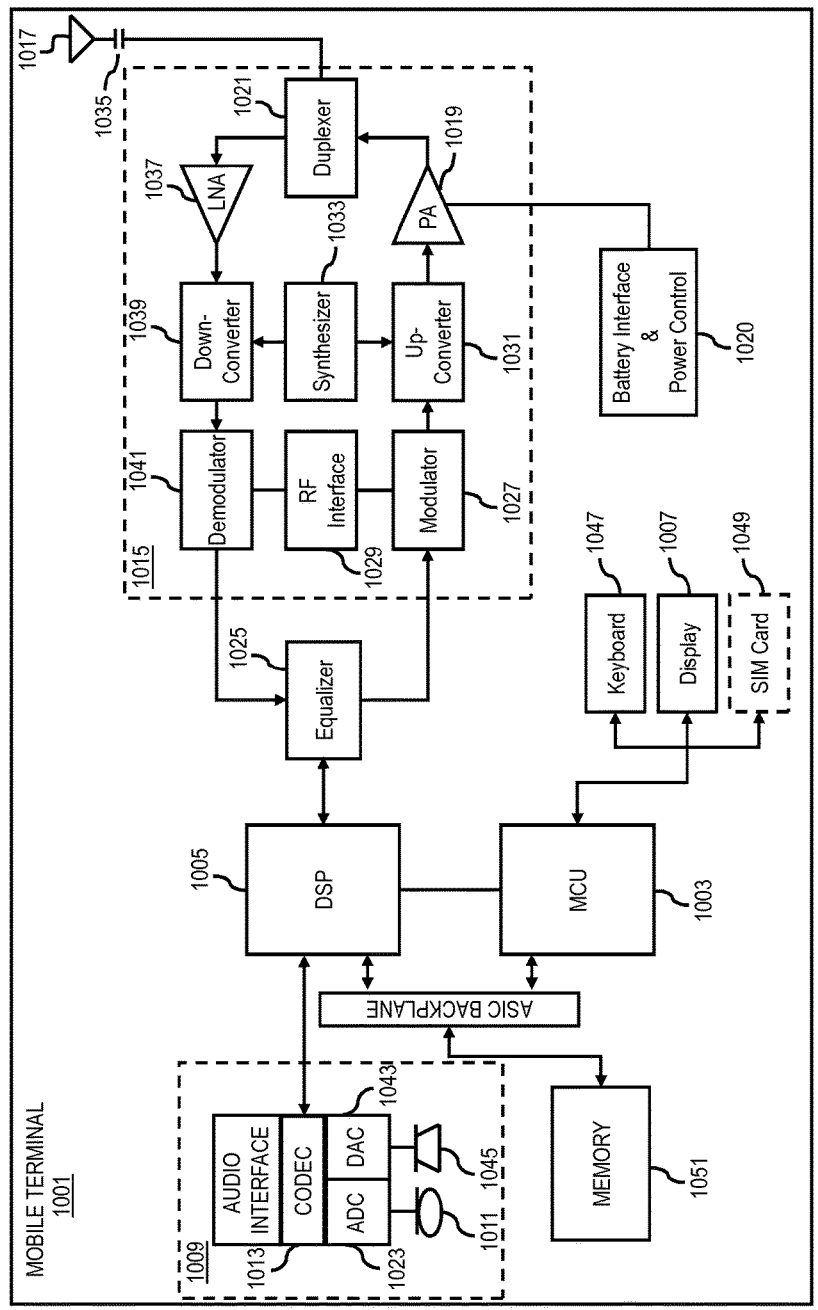
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing a route forecast user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a route forecast user interface. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. For example, the display 1007 and/or the display circuitry may be configured to support touch-based input, gesture-based input, pressure-sensitive touch input, and the like. In one embodiment, such touch-based input can be supported by any available technologies including, but not limited to, capacitive touch technology, resistive touch technology, visible light based touch sensors, infrared light-based touch sensors, etc An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairment that occurs during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a route forecast user interface. The MCU 1003 also delivers a display command and a switch command to the display 1007 and to the speech output switching controller, respectively.

Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining a target geographic point and a target time of arrival at the target geographic point of a target calendar entry;
   causing, at least in part, a calculation of at least one reachability forecast with respect to transportation parameters, wherein the at least one reachability forecast indicates whether a user can reach the target geographic point at the target time from a starting geographic point, at least one starting time, or a combination thereof of a starting calendar entry with respect to the transportation parameters that include a plurality of modes of transport, and the modes of transport include at least two of driving, walking, and using public transportation;
   causing, at least in part, a generation of representations of the at least one reachability forecast with respect to each of the modes of transport; and
   causing, at least in part, a presentation of the representations with respect to each of the modes of transport side-by-side between the starting and target calendar entries in a calendar-based user interface.

2. A method of claim 1, further comprising:
   causing, at least in part, visual representations of the modes of transport with respective latest possible time points to reach the target geographic point at the target time in the calendar-based user interface.

3. A method of claim 1, further comprising:
determining at least one visual characteristic of the representations based, at least in part, on the at least one reachability forecast and the modes of transport,
    wherein the at least one visual characteristic includes, at least in part, a color, an icon, or combination thereof.

4. A method of claim 3, wherein determining the color for the representations comprises at least one of the following:
specifying a first color as the color if the user can reach the target geographic point earlier than a specified time period before the target time;
specifying a second color as the color if the user can reach the target geographic point later than a specified time period but before the target time; and
specifying a third color as the color if the user cannot reach the target geographic point earlier than the target time.

5. A method of claim 1, further comprising:
determining the target geographic point and the target time of arrival from at least one appointment scheduled in at least one calendar of the user; and
determining a plurality of starting time points to at least one other appointment scheduled in the at least one calendar, from the target geographic point at the target time of arrival, from at least one current location of the user at a specified time, or a combination thereof.

6. A method of claim 5, further comprising:
causing, at least in part, a presentation of the representations of the at least one reachability forecast between the at least one appointment and the at least one other appointment in the calendar-based user interface, between the at least one current location at the specified time, a second location of the at least one appointment at a subsequent time, and a third location of the at least one other appointment at a time later than the subsequent time, or a combination thereof.

7. A method of claim 1, further comprising:
determining at least one recommended transportation parameter from among the transportation parameters based, at least in part, on the at least one reachability forecast; and
causing, at least in part, a presentation of the at least one recommended transportation parameter in the calendar-based user interface.

8. A method of claim 1, further comprising:
determining that the user will reach the target geographic point earlier with a specified time period before the target time based, at least in part, on the at least one reachability forecast; and
determining one or more recommendations of one or more points of interest and one or more respective user activities other than transportation based, at least in part, on the specified time period, wherein the one or more points of interest are along a route between a current location of the user and the target geographic point.

9. A method of claim 1, further comprising:
determining contextual information associated with travel between the starting geographic point and the target geographic point, wherein the contextual information includes, at least in part, weather information, traffic information, cost information, or a combination thereof;
determining that one or more other points of interest and one or more other respective user activities other than transportation as recommendable based, at least in part, on the contextual information, wherein the one or more other points of interest are along the route between the current location of the user and the target geographic point;
determining that the one or more other points of interest and the one or more other respective user activities require a time period longer than the specified time period; and
causing, at least in part, an exclusion of the one or more other points of interest and the one or more other respective user activities from the representations.

10. A method of claim 1, further comprising:
causing, at least in part, a presentation of the one or more recommendations and the one or more respective user activities other than transportation in the representations as one or more interactive elements of the at least one reachability forecast with respect to at least one of the modes of transport in the calendar-based user interface,
wherein one or more user interactions with the one or more interactive elements causes, at least in part, a presentation of information related to the at least one reachability forecast, the at least one of the modes of transport, the one or more recommendations, or a combination thereof.

11. An apparatus comprising:
at least one processor; and
at least one memory including computer program code for one or more programs,
the at least one memory and the computer program code configured to, with the at least one processor, cause the apparatus to perform at least the following,
    determine a target geographic point and a target time of arrival at the target geographic point of a target calendar entry;
    cause, at least in part, a calculation of at least one reachability forecast with respect to transportation parameters, wherein the at least one reachability forecast indicates whether a user can reach the target geographic point at the target time from a starting geographic point, at least one starting time, or a combination thereof of a starting calendar entry with respect to the transportation parameters that include a plurality of modes of transport, and the modes of transport include at least two of driving, walking, and using public transportation;
    cause, at least in part, a generation of representations of the at least one reachability forecast with respect to each of the modes of transport; and
    cause, at least in part, a presentation of the representations with respect to each of the modes of transport side-by-side between the starting and target calendar entries in a calendar-based user interface.

12. An apparatus of claim 11, wherein the apparatus is further caused to:
cause, at least in part, visual representations of the modes of transport with respective latest possible time points to reach the target geographic point at the target time in the calendar-based user interface.

13. An apparatus of claim 11, wherein the apparatus is further caused to:
determine at least one visual characteristic of the representations based, at least in part, on the at least one reachability forecast,
    wherein the at least one visual characteristic includes, at least in part, a color, an icon, or combination thereof.

14. An apparatus of claim 13, wherein determining the color for the representations causes the apparatus to further:
  specify a first color as the color if the user can reach the target geographic point earlier than a specified time period before the target time;
  specify a second color as the color if the user can reach the target geographic point later than a specified time period but before the target time; and
  specify a third color as the color if the user cannot reach the target geographic point earlier than the target time.

15. An apparatus of claim 11, wherein the apparatus is further caused to:
  determine the target geographic point and the target time of arrival from at least one appointment scheduled in at least one calendar of the user; and
  determine the at least one starting point, the at least one starting time, or a combination thereof from at least one other appointment scheduled in the at least one calendar, at least one current location of the user, at least one current time, at least one specified location, at least one specified time, or a combination thereof.

16. An apparatus of claim 15, wherein the apparatus is further caused to:
  cause, at least in part, a presentation of the representations of the at least one reachability forecast between the at least one appointment and the at least one other appointment in the calendar-based user interface.

17. An apparatus of claim 11, wherein the apparatus is further caused to:
  cause, at least in part, a presentation of the representations as one or more interactive elements in the calendar-based user interface,
  wherein one or more user interactions with the one or more interactive elements causes, at least in part, a presentation of information related to the at least one reachability forecast, the transportation parameters, or a combination thereof.

18. A non-transitory computer-readable storage medium carrying one or more sequences of one or more instructions which, when executed by one or more processors, cause an apparatus to at least perform the following steps:
  determining a target geographic point and a target time of arrival at the target geographic point of a target calendar entry;
  causing, at least in part, a calculation of at least one reachability forecast with respect to transportation parameters, wherein the at least one reachability forecast indicates whether a user can reach the target geographic point at the target time from a starting geographic point, at least one starting time, or a combination thereof of a starting calendar entry with respect to the transportation parameters that include a plurality of modes of transport, and the modes of transport include at least two of driving, walking, and using public transportation;
  causing, at least in part, a generation of representations of the at least one reachability forecast with respect to each of the modes of transport; and
  causing, at least in part, a presentation of the representations with respect to each of the modes of transport side-by-side between the starting and target calendar entries in a calendar-based user interface.

19. A non-transitory computer-readable storage medium of claim 18, wherein the apparatus is further caused to perform:
  causing, at least in part, visual representations of the modes of transport with respective latest possible time points to reach the target geographic point at the target time in the calendar-based user interface.

20. A non-transitory computer-readable storage medium of claim 18, wherein the apparatus is further caused to perform:
  determining at least one visual characteristic of the representations based, at least in part, on the at least one reachability forecast,
  wherein the at least one visual characteristic includes, at least in part, a color, an icon, or combination thereof.

* * * * *